US 8,444,186 B2

(12) United States Patent
Jones et al.

(10) Patent No.: US 8,444,186 B2
(45) Date of Patent: May 21, 2013

(54) SEAL AND RESTRAINT SYSTEM FOR PLASTIC PIPE WITH LOW FRICTION COATING

(75) Inventors: Jim Jones, Aledo, TX (US); Mark Weih, Apex, NC (US)

(73) Assignee: S & B Technical Products, Inc., Fort Worth, TX (US)

( * ) Notice: Subject to any disclaimer, the term of this patent is extended or adjusted under 35 U.S.C. 154(b) by 534 days.

(21) Appl. No.: 12/623,580

(22) Filed: Nov. 23, 2009

(65) Prior Publication Data

US 2010/0264645 A1  Oct. 21, 2010

Related U.S. Application Data (60) Provisional application No. 61/170,717, filed on Apr. 20, 2009.

(51) Int. Cl.
*F16L 37/0925* (2006.01)

(52) U.S. Cl.
USPC ........... 285/339; 285/113; 285/307; 285/374; 285/910

(58) Field of Classification Search
USPC .................. 285/338–339, 95, 110–111, 113, 285/307, 374, 379, 910
See application file for complete search history.

(56) References Cited

U.S. PATENT DOCUMENTS

| 3,610,640 | A | | 10/1971 | Bollin et al. |
| 4,572,523 | A | | 2/1986 | Guettouche et al. |
| 4,693,483 | A | | 9/1987 | Valls |
| 4,826,028 | A | | 5/1989 | Vassallo et al. |
| 5,129,688 | A | * | 7/1992 | McGarvey .................... 285/328 |
| 5,335,946 | A | | 8/1994 | Dent et al. |
| 6,488,319 | B2 | | 12/2002 | Jones |
| 7,284,310 | B2 | | 10/2007 | Jones et al. |
| 2006/0119100 | A1 | | 6/2006 | Jones et al. |
| 2009/0060635 | A1 | | 3/2009 | Jones et al. |

* cited by examiner

*Primary Examiner* — Aaron Dunwoody
*Assistant Examiner* — Fannie Kee
(74) *Attorney, Agent, or Firm* — Charles D. Gunter, Jr.

(57) ABSTRACT

An apparatus for restraining plastic pipe against both internal and external forces at a pipe or fitting connection and to join and seal at least two pipes to form a pipeline is shown featuring an improved restraining and sealing mechanism. The restraining and sealing mechanism includes a circumferential housing and a companion sealing ring which are received within a mating groove provided in the belled end of a female pipe. The circumferential housing has an interior region which contains a gripping ring insert. The sealing ring and housing are integrally located within a belled pipe end during belling operations. Either the exterior of the gripping ring or the interior of the housing or both are provided with a low friction coating.

6 Claims, 4 Drawing Sheets

SEAL AND RESTRAINT SYSTEM FOR PLASTIC PIPE WITH LOW FRICTION COATING

CROSS REFERENCE TO RELATED APPLICATIONS

This application claims priority from an earlier filed provisional application Ser. No. 61/170,717, filed Apr. 20, 2009, entitled "Seal and Restraint System For Plastic Pipe With Low Friction Coating," by the same inventors.

BACKGROUND OF THE INVENTION

1. Field of the Invention

The present invention relates generally to the field of pipe connections, and in particular, to a dual function, self restraining and sealing system that is used to form a secure pipe connection between two plastic pipes and to a method of manufacturing the same.

2. Description of the Related Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC.

It is well known in the art to extrude plastic pipes in an elongated cylindrical configuration of a desired diameter and to then cut the extruded product into individual lengths of convenient size suitable for handling, shipping and installing. Each length of pipe is enlarged or "belled" at one end sufficiently to join the next adjacent pipe section by receiving in the female, belled end the unenlarged or "spigot" male end of the next adjacent length of pipe. The inside diameter of the bell is formed sufficiently large to receive the spigot end of the next section of pipe with sufficient clearance to allow the application of packing, caulking, elastomeric gaskets or other sealing devices designed to prevent leakage at pipe joints when a plurality of pipe lengths are joined to form a pipeline.

During a standard installation of a pipeline, in, for example, municipal installations, the joints between pipes and between pipes and fittings must be restrained to accommodate varying pressures as well as environmental influences. For example, there are various types of fitting connections which are commercially available and which are used in, for example, the waterworks industry. In one type of connection, the current restraint mechanism is an external clamping device which is totally separated from the sealing function. Thus, a separate mechanism must perform the sealing function. In another type of fitting connection, a gasket performs the sealing function. However, it is necessary that an external means must compress the gasket by mechanical action such as T-bolts. Most current restraining systems offered in the industry require a substantial amount of labor to install. Under most installation conditions, the restraining systems are cumbersome to install and represent a substantial additional effort for the contractor. As a result, these and other traditional restraining mechanisms of the prior art add considerable cost and complexity to the pipe installation as well as adding the possibility of human error depending upon the specific field conditions and applications.

In the early 1970's, a new technology was developed by Rieber & Son of Bergen, Norway, referred to in the industry as the "Rieber Joint." The Rieber system provided an integral sealing mechanism within the belled or female pipe end for sealing with the spigot end of a mating pipe formed from thermoplastic material. In the Rieber process, the elastomeric gasket was inserted within an internal groove in the socket end of the female pipe as the female or belled end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682. While the Rieber process provided an improved sealing system for plastic pipelines of the type under consideration, it did not include any integral restraint type mechanism.

Accordingly, there has continued to exist a need for a cost-effective, easy to manufacture and use combination seal and restraint system for restraining and sealing plastic pipe against internal and external forces at a pipe or fitting connection and for joining and sealing at least two plastic pipes at a pipe joint to form a pipeline which system is internal to the pipes themselves, rather than relying upon external connecting elements.

Applicant's now issued U.S. Pat. No. 7,284,310 addressed many of the above noted deficiencies in the prior art. The device described in the '310 patent included an improved restraining and sealing mechanism which was internal to the pipes being joined, rather than relying upon external restraint mechanisms. The restraining and sealing mechanism included a circumferential housing and a companion sealing ring which were both received within a mating groove provided in the belled end of a female pipe. The circumferential housing has an interior region which contains a gripping ring insert. The sealing ring and housing were integrally located within a belled pipe end during belling operations. Insertion of a mating male pipe end within the female, belled pipe end formed a secure pipe connection.

Despite the advances in the art represented by the device described in the '310 patent, a need continues to exist for further advances in the technology.

SUMMARY OF THE INVENTION

It is therefore an object of the present invention to provide a seal and restraint system in which the restraint mechanism is integral to the groove formed in the bell end opening of a female pipe member which member receives a mating male, spigot pipe end.

It is a further object of the invention to provide an improved seal and restraint system for plastic pipe joints utilizing a Rieber style "gasket formed" bell groove, which does not require assembly in the field and which thus simplifies installation of pipe sections at the pipe joints used to form a fluid conveying pipeline, thereby reducing the chance of human error or of damage or contamination of the gasket sealing surfaces.

Another object of the invention is to eliminate the need for an external clamping device of the type presently used in the industry to achieve the restraining function, which device is totally separated from the sealing function and which typically utilizes metallic components which are subject to corrosion over time.

Another object of the present invention is to provide an improved restraint system for plastic pipe which is simple in design and dependable in operation and which is less costly in terms of both materials and labor than the restraining systems presently employing external mechanical restraints.

In the method and apparatus of the invention, an integral bell pipe-to-pipe seal and restraint system is provided for restraining pipe against internal or external forces at a pipe coupling or fitting connection and for joining and sealing at least two pipes to form a pipeline. The seal and restraint system of the invention utilizes an elastomeric sealing ring in conjunction with a special cooperating restraint mechanism. The restraint mechanism is designed to work independently but in complimentary fashion with the seal and can accept different seal profiles. Alternatively, the seal and the restraint mechanism may be bonded or otherwise formed together so that they are handled as a single piece. The bonding may be intentionally weak so that the seal detaches from the restraint mechanism during the belling operation or during use.

In a particularly preferred form of the invention, the restraint mechanism includes a ring shaped housing having a circumferential housing interior region. The ring shaped housing is positioned on the exterior of a forming mandrel and the pipe bell end is formed over the housing in a Rieber style belling operation. A companion gripping ring is provided which can be installed and contained within a circumferential region provided in the housing interior. The gripping ring preferably has at least one circumferential slit in the circumference thereof which allows it to be installed after the female plastic pipe end is belled over the housing. The gripping ring is temporarily compressed and snapped or popped within the circumferential region provided in the housing interior. The gripping ring also has one or more rows of gripping teeth on an interior surface thereof for gripping a mating male plastic pipe.

Since the female end of the plastic pipe is belled around the sealing ring and at least the ring shaped housing of the restraining mechanism, the restraint system is integral with the bell as it leaves the point of manufacture at the pipe manufacturing plant. In this way, it is not necessary to install the restraint system in the field and, since the system is also locked in position at the factory by means of the belling operation, it is less likely to be dislodged or twisted during assembly of the pipe joint.

In the preferred embodiment of the invention, the plastic pipe is made of PVC. The preferred materials for the ring shaped housing and gripping ring include materials selected from the group consisting of metals, composites and rigid elastomers or plastics, preferably a hard metal. The preferred sealing ring is formed from a material selected from the group consisting of natural and synthetic rubbers and elastomers, polymeric plastics and composites.

In the preferred form of the invention, at least a selected one of the interior circumferential region of the housing and the exterior of the gripping ring have applied thereto a low friction coating. The preferred coating which is applied to a selected one of the exterior surface of the gripping ring and the interior surface of the housing is a permanent, sprayed-on coating which is applied and then heat treated. The preferred class of coatings are fluoropolymer coatings. Most preferably, a base, corrosion resistant coating is first applied to the selected one of the exterior surface of the gripping ring and the interior surface of the housing, followed by the fluoropolymer coating. The base coat can be an electrostatically applied corrosion resistant powder coating, an aqueous electrophoretically applied coating, an aqueous autophoretically applied coating or a conventional solvent or aqueous corrosion control coating.

The new sealing and restraint system of the invention has further mechanical aspects which improve its performance. The interior region of the companion housing of the restraint system of the invention has a leading end and a trailing end, and wherein the interior region of the housing adjacent the leading end is provided with a circumferential lip which serves as a positive stop for the gripping ring, to thereby prevent over compression of the male plastic pipe end upon insertion.

The companion gripping ring has a leading end and a trailing end, and wherein the interior surface of the gripping ring has a plurality of rows of gripping teeth, each row having a given tooth height, at least one selected row of the gripping teeth having a tooth height which exceeds the tooth height of the remaining rows of teeth. Most preferably, one row of teeth on the interior surface of the gripping ring is located adjacent the leading end of the gripping ring, and wherein the row of teeth on the interior surface of the gripping ring which is adjacent the leading end thereof has the greatest tooth height, as compared to the remaining rows of teeth.

The above as well as additional objectives, features, and advantages of the present invention will become apparent in the following detailed written description.

DETAILED DESCRIPTION OF THE PREFERRED EMBODIMENT

Figure 1:
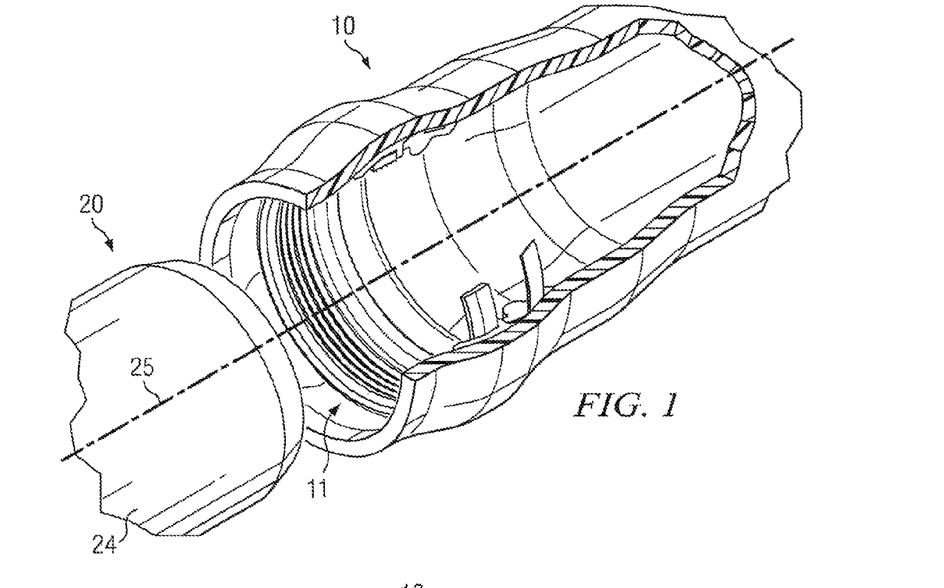
FIG. 1 is a perspective view, partly broken away, of male and female pipe sections about to be made up into a pipe coupling, the belled end of the female pipe section showing a preferred embodiment of the seal and restraint mechanism of the invention in place within a mating groove provided therein.

Turning to FIG. 1, there is shown an exploded view of a plastic pipe joint in which a belled female pipe end 10 is provided with an annular groove (shown as 12 in FIG. 2A) for receiving the seal and restraint mechanism 14 of the invention. The improved integral seal and restraint mechanism of the invention is capable of joining and sealing the female plastic pipe 10 to the spigot end of a mating male plastic pipe section 20 having an exterior surface 24. The plastic pipe male and female ends 10, 20 can be made from any convenient synthetic material including the polyolefins such as polyethylene and polypropylene but are preferably made from polyvinyl chloride (PVC).

Figure 2A:
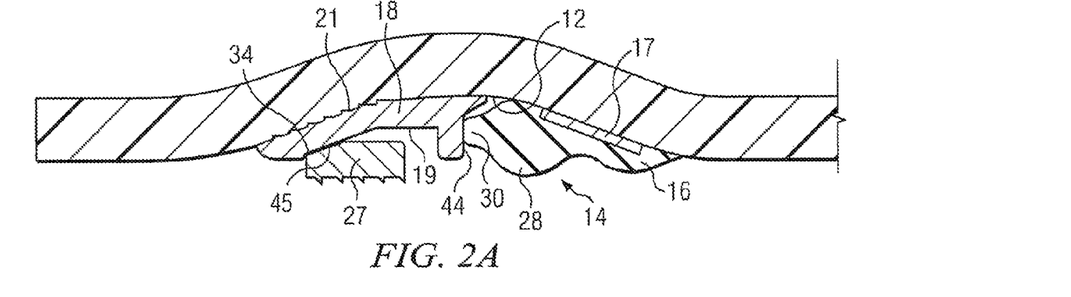
FIG. 2A is a side, cross-sectional view of a portion of the female pipe section showing the seal and restraint system of FIG. 1 in greater detail.
Figure 2B:
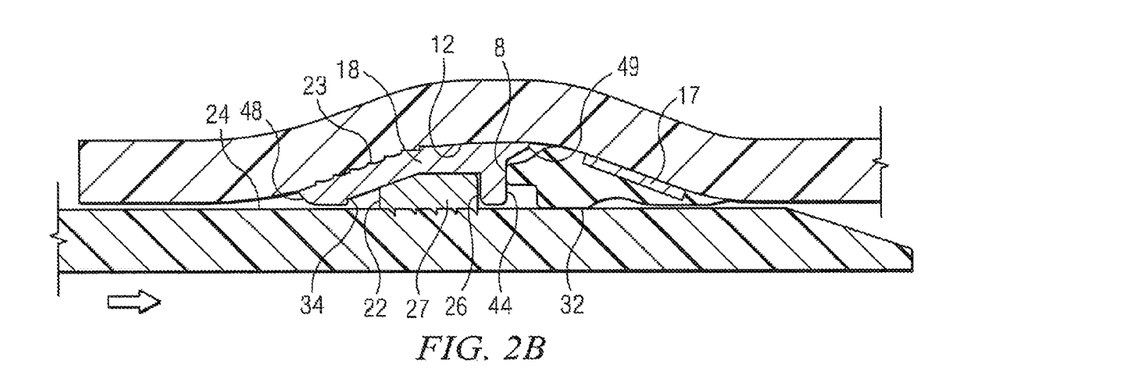
FIG. 2B is a view similar to FIG. 2A, but showing the step of inserting the male pipe section within the female, belled pipe end, the male and female pipe sections being joined to form a secure connection.

As best seen in FIGS. 1, 2A and 2B, the seal and restraint mechanism 14 includes an elastomeric, circumferential sealing ring 16 which is formed as an elastomeric body. The annular sealing ring 16 is somewhat tear drop shaped in cross section and includes a bulbous end region 28 (FIG. 2A) and a thinner forward most region 30. The bulbous end region 28 terminates in a nose portion (8 in FIG. 2B). The sealing portion also has an exposed sealing region (generally at 32) which contacts the exterior surface 24 (FIG. 2B) of the mating male pipe section upon assembly of the joint. The sealing member is preferably made of a resilient elastomeric or thermoplastic material. The sealing member can be formed, for example, from natural or synthetic rubber, such as SBR, or other elastomeric materials which will be familiar to those skilled in the plastic pipe arts such as EPDM or nitrile rubber. In this case, the sealing ring 16 has a metal reinforcing band 17 about the outer circumference thereof. However, as will be apparent from the description which follows, any number of specialized sealing rings can be utilized in order to optimize the sealing and restraining actions of the assembly.

The seal and restraint system of the invention also includes a companion restraint mechanism for the sealing ring 16 which allows movement of the mating male pipe (20 in FIG. 1) relative to the belled end of the female pipe 10 in a first longitudinal direction but which restrains movement in a second, opposite relative direction. The companion restraint mechanism includes a ring shaped housing 18 (FIG. 2A) having a circumferential interior region 19 and an exterior 21. The ring shaped housing provides radial stability and reinforcement for the male (spigot) pipe end during make up of the joint so that the male pipe end 20 is radially supported and remains perfectly circular during the joint assembly process. The exterior 21 extends from a nose region 48 (FIG. 2B) in convex fashion, gradually flattening out into a planar back region which terminates in a tip region 49. The tip region 49 serves as a protective skirt which covers any gap between the sealing ring 16 and ring shaped housing 18 during the pipe belling operation. Although the housing could have a circumferential opening, it is preferably provided as a solid ring of a slightly larger internal diameter than the forming mandrel (to be described) upon which it is received during pipe belling operations. Alternatively, the housing could be used with some form of collapsible forming mandrel, in which case its internal diameter might approach or exceed that of the mandrel in certain of its states of operation. The exterior 21 of the housing 18 may be equipped with one or more rows of gripping teeth 23 for engaging the surrounding pipe groove 12. The corresponding grooves or indentations in the pipe interior would be formed during the belling operation as the pipe cools. The ring shaped housing 18 is preferably formed of a material selected from the group consisting of metals, alloys, elastomers, polymeric plastics and composites and is rigid or semi-rigid in nature. Most preferably, the housing is formed of metal.

The leading portion of the circumferential interior region 19 is sloped upwardly with respect to the longitudinal axis (25 in FIG. 1) of the pipe. This leading portion 45 forms an upwardly sloping ramp surface for a companion gripping ring insert 27. The sloping ramp surface extends upwardly from a positive stop region (34 in FIG. 2B) and gradually flattens into a planar circumferential region which terminates in an internal shoulder (26 in FIG. 2B) arranged opposite an external shoulder 44. The positive stop region 34 is formed as a circumferential flange adjacent the leading end of the housing 18 and prevents the companion gripping insert 27 from overly compressing the O.D. of the mating male pipe as the pipe joint is being assembled.

The housing external shoulder (44 in FIGS. 2A and 2B) is substantially perpendicular to the longitudinal axis 25 of the female pipe. The external shoulder 44 is in contact with the nose region of the elastomeric body of the sealing ring 16 as the mating male pipe is inserted into the mouth opening (11 in FIG. 1) of the female belled pipe end 10. The housing and sealing ring are shown in FIGS. 2A and 2B as being provided as separate pieces. However, it will be appreciated that they can at least temporarily joined at a juncture point prior to the pipe belling operation. For example, a suitable glue or adhesive could be used to form a temporary juncture at the external shoulder 44 of the housing 18. In such case, the temporary juncture would typically be designed to be severed during the belling operation so that the sealing ring 16 and the housing 18 are separate at the time a pipe joint is made up in a field application. The housing 18 could also be integrated with the sealing ring 16, as during the curing of the elastomeric body of the ring.

FIGS. 2A and 2B illustrate the positioning of the companion ring-shaped gripping insert 27 which is received in complimentary fashion and contained within the circumferential interior region 19 of the housing 18. As shown in FIGS. 2A and 2B, the nose region 22 of the gripping insert 27 contacts the positive stop region 34 on the I.D. of the housing 18 in the forward most position to thereby assist in retaining the gripping insert within the housing. The gripping ring 27 has an exterior surface 31 (FIG. 3) and an interior surface 33 with at least one row of gripping teeth 35. In the embodiment of the invention shown in FIG. 3, the gripping ring 27 has five rows of teeth 35, 37, 39, 41 and 43. The rows of teeth are arranged for engaging selected points on the exterior surface 24 of the mating male pipe section 20.

The gripping ring exterior surface 31 has a sloping profile (42 in FIG. 3) which contacts the upwardly sloping ramp surface (generally at 45 in FIG. 2A) of the housing 18, whereby contact with the exterior surface 24 of a mating male pipe (20 in FIG. 2B) causes the gripping ring 27 to ride along the male pipe exterior surface at an angle while the row of gripping teeth on the gripping ring internal surface engage the exterior surface of the mating male pipe.

Figure 3:
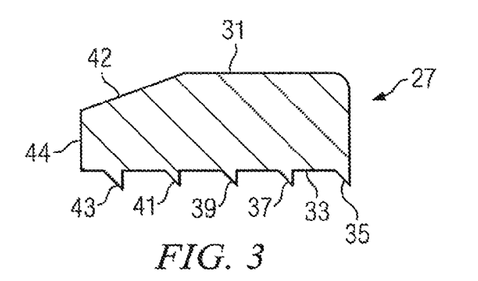
FIG. 3 is a cross sectional view of the gripping ring insert which is received within the circumferential interior region of the housing in the restraint system of the invention.

The rows of teeth 35, 37, 39, 41, 43 on the lower surface 33 of the gripping ring 27 can be of equal height as measured from the interior surface 33 or can vary in length and can be arranged in either a uniform or non-uniform pattern about the inner circumference of the gripping insert. Preferably, as shown in FIG. 3, the row of teeth 43 which is located adjacent the leading end 44 of the gripping ring 27 has a slightly greater height than the remaining four rows of teeth, all of which are of uniform height. The teeth of the gripping ring are also angled away from the horizontal axis of the joint (25 in FIG. 1) at an angle "a" of less than 90°.

Figure 5:
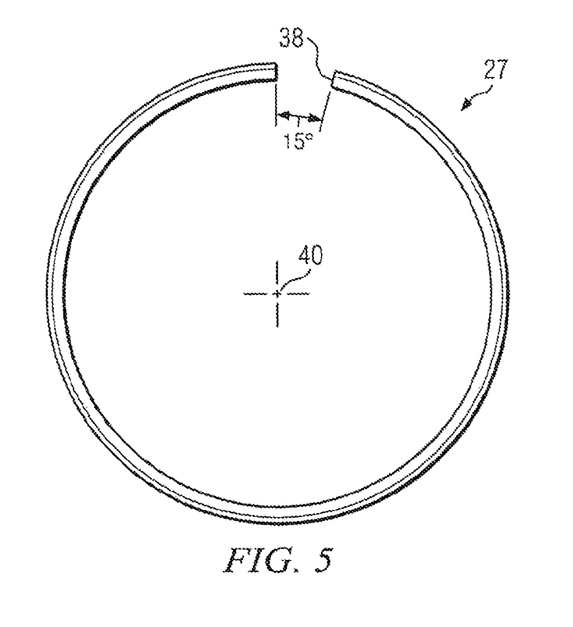
FIG. 5 is a top view of the gripping ring insert of FIG. 3 showing the slit in the circumference thereof which allows it to be compressed and inserted within the interior of the ring shaped housing.

As best seen in FIG. 5, the gripping ring has at least one slit 38 in the circumference thereof which forms an opening of approximately 15° with respect to the central axis 40, as viewed in FIG. 5, for the particular size gripping ring in question. The gripping ring 27 is a rigid or relatively rigid member. By "relatively rigid" is meant that the gripping ring 27 can be formed of a suitable metal, a corrosion resistant stainless steel, or from other metallic materials or alloys or even a hardened plastic or composite. Preferably the gripping ring 27 is formed of metal such as iron or steel.

Figure 4:
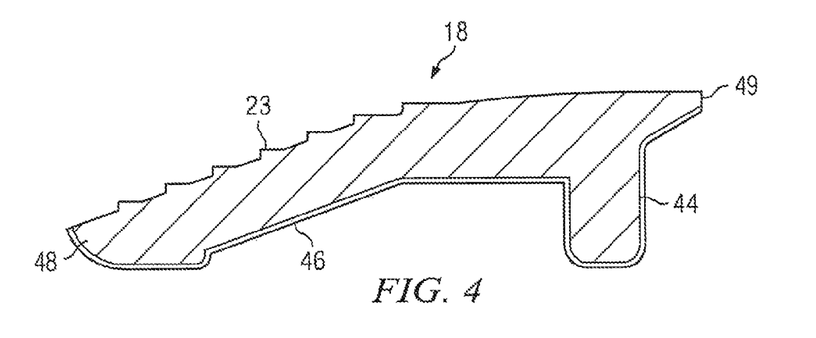
FIG. 4 is a cross sectional view, similar to FIG. 3, but of the ring shaped housing which forms a part of the restraint mechanism of the system of the invention.

In the improved version of the sealing and restraint system of the invention, at least a selected one of the interior circumferential region 19 of the housing 18 and the exterior 31 of the gripping ring 27 have applied thereto a low friction coating. In the embodiment of the invention illustrated in FIG. 4 of the drawings, the interior region designated by the double lines as 46 of the housing 18 is coated with a low friction coating. While the coating can take a number of different forms, the preferred coating which is applied to a selected one of the exterior surface of the gripping ring and the interior surface of the housing is a permanent, sprayed-on coating which is applied and then heat treated. Preferably, the coating which is applied to the selected one of the exterior surface of the gripping ring and the interior surface of the housing is a fluoropolymer coating. In the most preferred coating process, a base, corrosion resistant coating is first applied to the selected one of the exterior surface of the gripping ring and the interior surface of the housing, followed by the fluoropolymer coating. The base coat can be an electrostatically applied corrosion resistant powder coating, an aqueous electrophoretically applied coating, an aqueous autophoretically applied coating or a conventional solvent or aqueous corrosion control coating.

The base coat is not particularly critical, with the exception that it must bond with and act as a "primer" for the subsequently applied top low friction coating. For example, the base coat could be an AquaArmor® inner coat to which is applied a top coat of a suitable synthetic polymer. The AquaArmor® coating is described in patent publication no. 20070196585, "Method of Applying a Phenolic Resin Corrosion Protective Coating to a Steel Component", published Aug. 23, 2007. The AquaArmor® coating, available from AquaArmor Technologies, 1300 East Berry Street, Fort Worth, Tex., is a corrosion resistant coating which is an aqueous phenolic resin dispersion. The component is dipped in a bath of the corrosion resistant coating and then baked, dried and cooled.

Another base coat from PPG Industries, the Cathodic E-coat (or electrophoretic coating), is an emulsion of organic resins, polymers, and de-ionized water, which are stable in the absence of electric current. The resins consist primarily of epoxy phenolic resins and urethane polymers. When a D.C. voltage is applied across two immersed electrodes (the surface to be coated is the cathode), the passage of current is accompanied by electrolysis of water. This results in oxygen gas being liberated at the anode (positive electrode) and hydrogen gas liberated at the cathode (negative electrode). The liberation of these gases disturbs the hydrogen ion equilibrium in the water immediately surrounding the electrodes. This results in a corresponding pH change at the cathode or surface to be coated, and this in turn de-stabilizes the paint components of the solution and they coagulate onto the appropriate electrode or surface The paint particles that are in contact with the product (the cathode) adhere to the surface, and build up an electrically insulating layer. As this layer builds, current can no longer pass, preventing any further destabilization and coating buildup, resulting in a perfectly level coating even in the recessed parts of complex-shaped goods. The product is then removed from the paint bath and baked in an oven. This baking process cross links the epoxy resins and urethane polymers giving a hard, smooth, corrosion resistance surface, typically of 1.5 to 3 mils thickness The preferred top coat which is applied to the interior circumferential region 19 of the housing 18 or the exterior 31 of the gripping ring is a synthetic polymeric coating. The selected synthetic polymer is preferably thermoplastic and can be selected from such materials as polyvinyl chloride, fluoroplastic polymers, nylon, and the like, depending upon the end application of the pipe joint. The preferred coatings are fluoroplastic polymers, sometimes referred to as "fluoroelastomers." These materials are a class of paraffinic polymers that have some or all of the hydrogen replaced by fluorine. They include polytetrafluoroethylene, fluorinated ethylene propylene copolymer, perfluoroalkoxy resin, polychloro-trifluoroethylene copolymer, ethylene-tetra-fluoroethylene copolymer, polyvinylidene fluoride and polyvinyl fluoride. Fluoroplastics have a low coefficient of friction, especially the perfluorinated resins, giving them unique non-adhesive and self lubricating surface qualities.

One class of polymers of this above described general type is the class of materials referred to generically as polytetrafluoroethylene (PTFE). This material is a completely fluorinated polymer manufactured by free radical polymerization of tetrafluoroethylene, and is well known in a variety of industries. With a linear molecular structure of repeating—$CF_2$—$CF_3$-units, PTFE is a crystalline polymer with a melting point of 327 degrees C. Density is 2.13 to 2.19 g/cc. PTFE's coefficient of friction is lower than almost any other known material. It is available in granular, fine powder (e.g., 0.2 micron), and water based dispersion forms. In the United States, PTFE is sold as "TEFLON" by Du Pont de Nemours Co.

A particularly preferred material for the top coat is a Xylan® coating, supplied by Whitford Corp. This coating is available from a number of commercial sources. It has the following published characteristics:

| | |
|---|---|
| Tensile Strength ASTM D1708 | 4000-5000 psi |
| Elongation ASTM 1457 | 50% |
| Impact Strength ASTM D256 | 13 ft-lb/in |
| Hardness ASTM D2240 | 60-90 HB shore D |
| Abrasion Resistance, Tabor | >15 mg |
| Coefficient of Friction ASTM D1894 | .15-.35 static |
| Dielectric Strength ASTM D149 | 1400 volts per mil |
| Use Temperature | −100° F. to 500° F. max |
| Melting point | n/a |
| Thermal conductivity | n/a |
| Chemical Resistance ASTM D543 | good |
| Salt Spray Resistance ASTM B117 | excellent |
| Water Absorption ASTM D570 | <.03% |
| Thickness | .0008" to .002" |

The non-stick, anti-friction coating used in the method of the invention can be applied by spraying on with a spray gun, followed by heating to fix or cure the coating. The techniques used can vary from conventional air atomized spray coating using a spray gun to such techniques as electrostatic deposition, however. The metal parts receiving the coating should be free of dirt, oil and other contaminants that could interfere with the coating adhering to the metal. The coating is typically applied by an air spray gun to a mil thickness of about 0.8 to 1.1 mils. It is recommended that the coating be baked to the metal ring to get the optimum physical properties. The applied coating can withstand intermittent temperatures to about 200° C. In one exemplary treatment process, the base coated metal parts were first alcohol wiped to remove loose soils and dust. The parts were then preheated to approximately 60° C. The Xylan 1424® coating was then spray applied to completely coat the inside of the metal housings. A light coat was also applied to the outside of the housings to cover the black undercoat. This was done by applying the coating until the surface had a wet look. After drying this gave a coating of about 1.0 mils of Xylan®. The parts were then dried for 2-3 minutes at ambient temperature, followed by baking for 30 minutes at 200° C.

The top coat can also have a color additive, such as a suitable pigment, dispersed therein which impart a distinctive color to the coated region of the gasket. Color markings of this type can be used for product identification purposes, e.g., for use as a water pipe joint, a sewer pipe joint, etc.

FIGS. 1, 2A and 2B also illustrate the make-up of a joint of plastic pipe in which the male spigot end 20 is inserted within the belled female pipe section 10. FIG. 2B illustrates the gripping action of the rows of teeth 35, 37, 39, 41, 43 of the gripping ring in which the teeth grip the exterior surface 24 of the male pipe section 20. The rows of teeth 35, 37, 39, 41, 43 are angled inwardly with respect to the central axis 25 of the pipe so that contact with the male pipe end (20 in FIG. 2B) causes the teeth to be deflected in a counterclockwise direction with respect to axis 25 during the insertion step, as viewed in FIG. 2B. Once the male pipe section 20 has been fully inserted, the rows of teeth 35, 37, 39, 41, 43 grip the exterior surface of the male pipe and resist movement in an opposite longitudinal direction. The nose region 8 (FIG. 2B) of the sealing ring 16 also contacts and forms a sealing region with respect to the external shoulder 44 of the housing 18.

In order to explain the manufacturing process used to locate the seal and restraint system of the invention within the mating groove provided in the female pipe end 10, it is necessary to briefly explain the prior art "Rieber" process for plastic pipe manufacture that was briefly described in the Background of the Invention. As previously described, in the Rieber process, the elastomeric gasket was installed within a simultaneously formed internal groove in the socket end of the female pipe during the pipe belling process. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion.

While the Rieber process provided an integral sealing gasket which was "prelocated" within the belled, female pipe end in a groove which was formed about the gasket, it did not provide any mechanical "restraining function" to prevent separation of the male and female pipe ends at the pipe connection once the pipe joint was made up.

Figure 6:
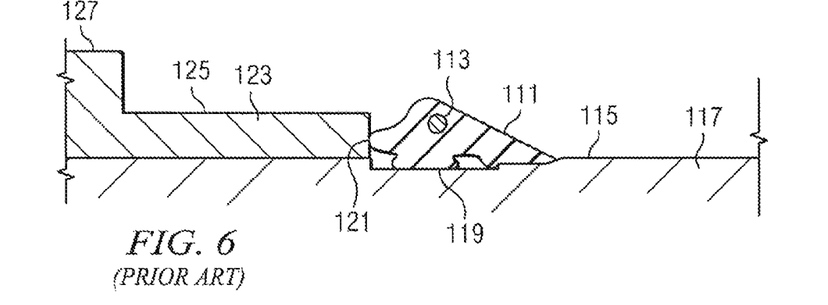
FIGS. 6-9 are simplified, schematic views of the prior art Rieber pipe belling process used to form the female, belled pipe end.

The relevance of the Rieber process to Applicant's invention can perhaps best be appreciated with reference to the description of the prior art process shown in FIGS. 6-9. FIG. 6 shows a section of a conventional elastomeric sealing gasket 111 having a steel reinforcing ring 113 in place on the generally cylindrical outer working surface 115 of the mandrel 117 used in the belling process. The elastomeric gasket 111 can be formed of, for example, SBR rubber and is a ring shaped, circumferential member having an inner compression surface 119 and an exposed nose portion 121 which, as shown in FIG. 6, abuts a forming collar 123. The forming collar 123 has a first generally cylindrical extent 125 which is joined to a second cylindrical extent 127 by a step region 129, whereby the second extent 127 is of greater external diameter than the first cylindrical extent 125, shown in FIG. 6.

In the first step of the prior art process, the steel reinforced elastomeric ring 111 is thus placed onto the working surface of the mandrel 117 and pushed to a position against the back-up or forming collar 123. In this position, the gasket is firmly anchored to the mandrel surface with the rubber between the mandrel and the steel-ring of the gasket being compressed by approximately 20%.

Figure 7:
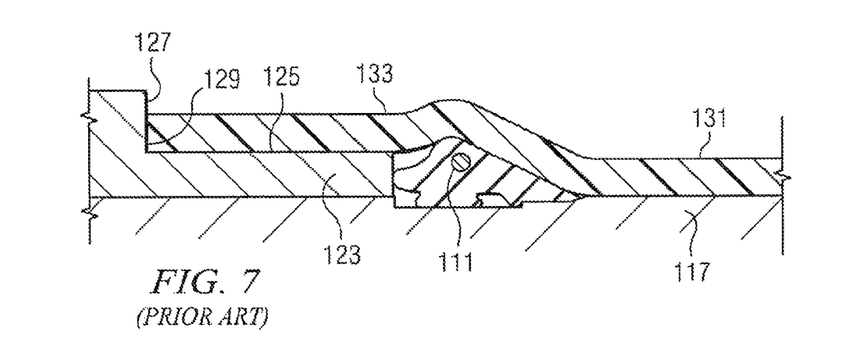
Figure 8:
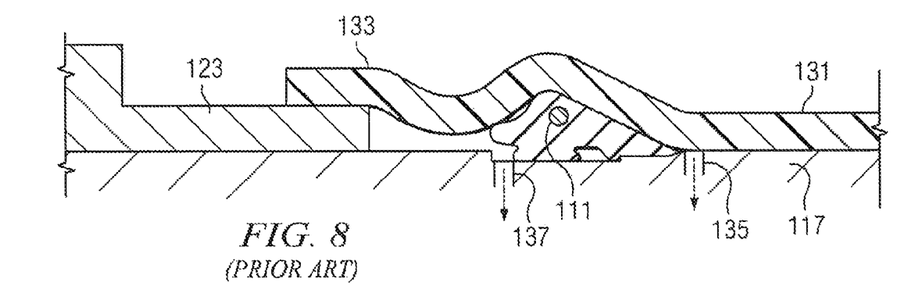
Figure 9:
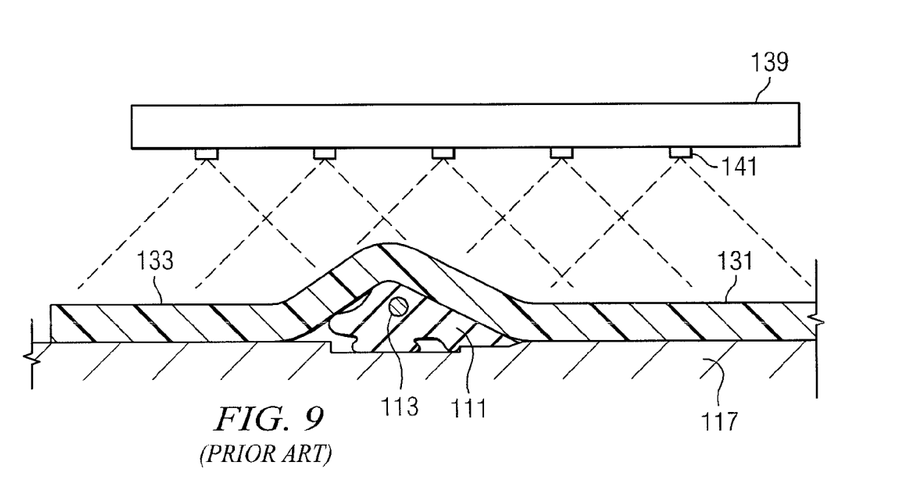

In the second step of the prior art process shown in FIG. 7, the socket end 133 of the thermoplastic pipe 131 is heated and pushed over the steel mandrel 117, gasket 111 and back-up collar 123. The socket end 133 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. However, the preferred material for this application is PVC due to its expansion and contraction characteristics. The socket end 133 flows over the first cylindrical extent 125 of the back-up collar 123 and abuts the step region 129 in the second step of the process. Note that the pipe end is deformed by the presence of the gasket 111 so that a gasket receiving groove is formed with the pipe I.D.

In the next step of the prior art process (FIG. 8) the mandrel and pipe move away from the back-up collar 123 and the pipe socket end 133 retracts around the mandrel and gasket 111 due to the elastic forces of the thermoplastic material. Typically, vacuum was also applied through ports 135, 137 which connected the mandrel working surface with a vacuum source (not shown). In the final step of the prior art process shown in FIG. 9, the pipe socket end 133 is cooled by means of a water spray bar 139 and spray nozzles 141. As the cooling takes place, the pipe socket end 133 shrinks around the gasket 111, thus compressing the rubber body of the gasket between the steel reinforcing ring 113 and the socket-groove to establish a firm seal. The above described Rieber process has been in commercial use since the early 1970's and is described in the above referenced issued United States patents, among other sources. It will thus be well familiar to those skilled in the thermoplastic pipe sealing arts.

Applicant's seal and restraint mechanism differs from the above described Rieber process in that the system of the invention serves to provide both sealing and restraining functions. In the preferred embodiment, the system is comprised of two distinct components, the previously described sealing ring 16 and the housing 18 and companion gripping ring 27, rather than a single elastomeric component.

Figure 10:
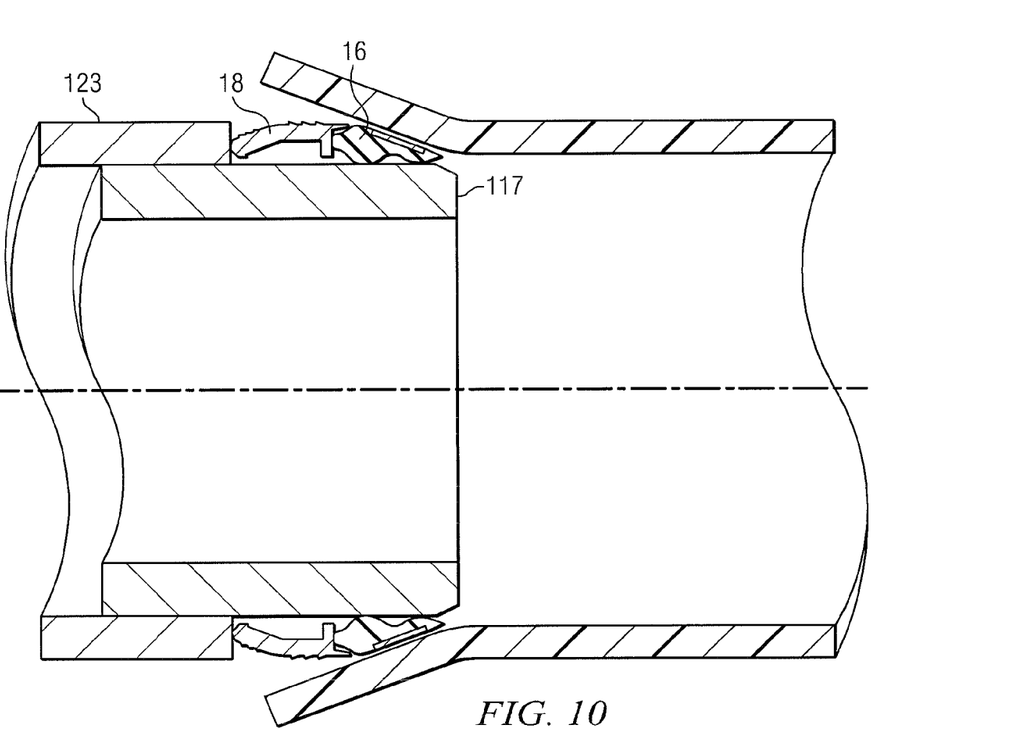
FIG. 10 is a simplified, side view, in partial cross section of one version of a forming mandrel used with the sealing and restraint system of the invention.

The method of installing the components of the restraining system of the invention will now be described with reference to FIG. 10 of the drawings. In the preferred method of installation, the sealing ring (16 in FIG. 10) and ring shaped housing 18 are placed side by side on the forming mandrel 117 and the female pipe end is heated and belled over these components in the normal fashion, as has been described with respect to the Rieber process. The backup collar position or the mandrel seating groove location and size may have to be adjusted for the resulting changes in bell dimensions, i.e., to allow enough room for the housing 18. Once the belled pipe end has been cooled and the forming mandrel has been retracted, the gripping ring 27 can be snapped or popped into position on the inner circumference of the housing 18, so that it resides in the position shown in FIGS. 2A and 2B of the drawings.

It may also be possible to bell the female pipe end over the housing 18 with the gripping insert ring 27 already in place on the inner circumference of the housing 18. This could be accomplished, for example, by using a collapsible mandrel, or the like. This would generally necessitate the provision of more specialized design features being incorporated into the forming mandrel, however.

Because the pipe joints of the invention incorporate both a sealing member and a separate gripping member, they depart from the teaching of the prior art Rieber belling process. However, as in the Rieber manufacturing process described above, the preferred seal and restraint mechanism of the invention is integrally belled in the female pipe end during manufacture of the bell end. Thus, the seal and restraint mechanism of the invention can be installed and prelocated within a mating pipe groove in the "Rieber style", with the exception that it may be necessary to use a "collapsible mandrel" or a "ramp" style mandrel to accommodate the housing if the gripping ring is pre-installed within the companion housing. Also, while the invention has been described with reference to a single internal groove formed within the female bell pipe end, it will be understood that two or more grooves can be formed in the bell pipe end, either mechanically at the factory prior to installing the restraining system components, or in the Rieber fashion so that the grooves are simultaneously formed about the restraining system positioned on the forming mandrel.

An invention has been provided with several advantages. The present invention provides a sealing and restraint system in which the restraint mechanism is integral to the groove formed in the bell end opening of a female pipe member. The restraining mechanism may be provided as a part of a "gasket formed" bell groove, as in a Rieber style pipe belling operation where the groove is simultaneously formed as the bell pipe end is formed. In its most preferred form, the manufacturing method and device of the invention provide an improved seal and restraint system for plastic pipe joints utilizing the "gasket formed" bell groove, which does not require assembly in the field and which thus simplifies installation of pipe sections at the pipe joints used to form a fluid conveying pipeline.

The integral restraint system of the invention eliminates the need for an external clamping device of the type presently used in the industry to achieve the restraining function, which device is totally separated from the sealing function. This eliminates the possibility of external corrosion of the metallic components of the prior art external restraints. The system of the invention is also simple in design, dependable in operation, and is less costly to manufacture than the prior art restraining systems which utilize external glands and mechanical restraint components.

Because the ring components of the restraint system of the invention are pre-installed, the possibility of mistakes during field assembly is virtually eliminated. Also, the gripping insert component of the invention applies more pressure to the exterior surface of the mating male spigot pipe end as internal pressure builds within the fluid coupling. This action helps to ensure the integrity of the joint. In addition, the gripping ring component aids in sealing the joint by keeping a constant gripping pressure on the male pipe end at even the lowest operating pressures of the pipeline.

The special low friction coating of the invention ensures proper sealing and restraint action in joint make-up by facilitating the relative movement of the metal parts. This is especially important in larger pipe sizes, such as pipe diameters, for example, of 10 or 12 inches. The positive stop in the housing interior and the tooth height and tooth arrangement on the gripping ring all work in a cooperative fashion with the low friction coating to provide an improved sealing and restraint action as the pipe joint is being made-up.

While the invention has been shown in only one of its forms, it is not thus limited but is susceptible to various changes and modifications without departing from the spirit thereof.

What is claimed is:

1. A combination seal and restraint system capable of both joining and sealing a female plastic pipe to a mating male plastic pipe having an interior surface and an exterior surface, the seal and restraint system comprising:

a sealing ring formed as an elastomeric body, the sealing ring being integrally installed within a groove formed in a belled end of the female pipe during the manufacture of the belled pipe end;

a companion restraint mechanism for the elastomeric sealing ring which allows movement of the mating male pipe relative to the belled end of the female pipe in a first longitudinal direction but which restrains movement in a second, opposite relative direction, the restraint mechanism including a ring shaped housing which is also integrally installed within the belled pipe end during manufacture and which has a circumferential interior region;

the restraint mechanism also including a companion gripping ring which is installed as an insert within the circumferential interior region of the housing, the gripping ring having an exterior surface and having an interior gripping surface with at least one row of gripping teeth; and wherein a selected one of the interior circumferential region of the housing and the exterior of the gripping ring have applied thereto a low friction coating;

wherein the coating which is applied to a selected one of the exterior surface of the gripping ring and the interior surface of the housing is a permanent, sprayed-on fluoropolymer coating which is applied and then heat treated;

wherein a base, corrosion resistant coating is first applied to the selected one of the exterior surface of the gripping ring and the interior surface of the housing, followed by the fluoropolymer coating;

wherein the base coating is selected from the group consisting of an electrostatically applied corrosion resistant powder coating, an aqueous electrophoretically applied coating, an aqueous autophoretically applied coating and a solvent or aqueous corrosion control coating;

wherein the gripping ring exterior surface has a sloping profile which contacts a mating sloping interior surface of the housing, whereby insertion of a male pipe end within the female, belled pipe end causes the gripping ring exterior surface to ride up the sloping interior surface of the housing as the row of teeth on the gripping ring interior surface engage the male pipe end, the low friction coating serving to facilitate the movement of the gripping ring along the sloping profile of the housing in a direction generally along the same first longitudinal direction as the mating male pipe end.

2. The combination seal and restraint system of claim 1, wherein the gripping ring is a ring-shaped member having at least one circumferential slit in the circumference thereof which allows the gripping ring to be temporarily compressed and installed within the circumferential interior region of the housing in snap-fit fashion after the ring shaped housing has been integrally installed within the belled pipe end during manufacture of the female pipe.

3. The combination seal and restraint system of claim 2, wherein the housing interior surface has a leading end and a trailing end, and wherein the interior surface of the housing adjacent the leading end is provided with a circumferential lip which serves as a positive stop for the gripping ring, to thereby prevent over compression of the male pipe end upon insertion.

4. The combination seal and restraint system of claim 1, wherein the housing has a rear wall region which is substantially perpendicular to a longitudinal axis of the female pipe, the rear wall region being in contact with the elastomeric body of the sealing ring as the mating male pipe is inserted into a mouth opening of the female plastic pipe.

5. The combination seal and restraint system of claim 4, wherein the housing exterior surface has at least one row of biting teeth for biting an internal diameter of the female plastic pipe, the biting teeth being located on a region of the exterior surface which is forward of a vertical central axis of the housing.

6. A combination seal and restraint system capable of both joining and sealing a female plastic pipe to a mating male plastic pipe having an interior surface and an exterior surface, the seal and restraint system comprising:

- a sealing ring formed as an elastomeric body, the sealing ring being integrally installed within a groove formed in a belled end of the female pipe during the manufacture of the belled pipe end;
- a companion restraint mechanism for the elastomeric sealing ring which allows movement of the mating male pipe relative to the belled end of the female pipe in a first longitudinal direction but which restrains movement in a second, opposite relative direction, the restraint mechanism including a ring shaped housing which is also integrally installed within the belled pipe end during manufacture and which has a circumferential interior region;
- the restraint mechanism also including a companion gripping ring which is installed as an insert within the circumferential interior region of the housing, the gripping ring having an exterior surface and having an interior gripping surface with at least one row of gripping teeth;
- wherein a selected one of the interior circumferential region of the housing and the exterior of the gripping ring have applied thereto a low friction coating;
- wherein the coating which is applied to a selected one of the exterior surface of the gripping ring and the interior surface of the housing is a permanent, sprayed-on fluoropolymer coating which is applied and then heat treated;
- wherein a base, corrosion resistant coating is first applied to the selected one of the exterior surface of the gripping ring and the interior surface of the housing, followed by the fluoropolymer coating; and
- wherein the base coating is selected from the group consisting of an electrostatically applied corrosion resistant powder coating, an aqueous electrophoretically applied coating, an aqueous autophoretically applied coating and a solvent or aqueous corrosion control coating;
- wherein the gripping ring exterior surface has a sloping profile which contacts a mating sloping interior surface of the housing, whereby insertion of a male pipe end within the female, belled pipe end causes the gripping ring exterior surface to ride up the sloping interior surface of the housing as the row of teeth on the gripping ring interior surface engage the male pipe end, the low friction coating serving to facilitate the movement of the gripping ring along the sloping profile of the housing in a direction generally along the same first longitudinal direction as the mating male pipe end;
- wherein the gripping ring has a leading end and a trailing end, and wherein the interior surface of the gripping ring has a plurality of rows of gripping teeth, each row having a given tooth height, at least one selected row of the gripping teeth having a tooth height which exceeds the tooth height of the remaining rows of teeth, wherein one row of teeth on the interior surface of the gripping ring is located adjacent the leading end of the gripping ring, and wherein the row of teeth on the interior surface of the gripping ring which is adjacent the leading end thereof has the greatest tooth height, as compared to the remaining rows of teeth.

\* \* \* \* \*